United States Patent
Dambrine et al.

(10) Patent No.: US 12,203,483 B2
(45) Date of Patent: Jan. 21, 2025

(54) FIBER-REINFORCED COMPOSITE PART WITH INCREASED VIBRATION RESISTANCE

(71) Applicant: SAFRAN, Paris (FR)

(72) Inventors: Bruno Jacques Gérard Dambrine, Moissy-Cramayel (FR); Bastien Tranquart, Moissy-Cramayel (FR); Dominique Marie Christian Coupe, Moissy-Cramayel (FR); Marc-Antoine Colot, Moissy-Cramayel (FR)

(73) Assignee: SAFRAN, Paris (FR)

( * ) Notice: Subject to any disclaimer, the term of this patent is extended or adjusted under 35 U.S.C. 154(b) by 856 days.

(21) Appl. No.: 17/416,298

(22) PCT Filed: Dec. 19, 2019

(86) PCT No.: PCT/FR2019/053209
§ 371 (c)(1),
(2) Date: Jun. 18, 2021

(87) PCT Pub. No.: WO2020/128367
PCT Pub. Date: Jun. 25, 2020

(65) Prior Publication Data
US 2022/0074309 A1   Mar. 10, 2022

(30) Foreign Application Priority Data
Dec. 21, 2018   (FR) ...................... 1873851

(51) Int. Cl.
*F04D 29/32*   (2006.01)
*B29C 70/24*   (2006.01)
(Continued)

(52) U.S. Cl.
CPC ............ *F04D 29/324* (2013.01); *B29C 70/24* (2013.01); *D03D 25/005* (2013.01);
(Continued)

(58) Field of Classification Search
CPC ....... B29C 70/024; B29C 70/24; F04D 29/34; F04D 29/023; F04D 29/38; F04D 29/324;
(Continued)

(56) References Cited

U.S. PATENT DOCUMENTS

| 4,902,548 A * | 2/1990 | Cholat-Serpoud ....... A63C 5/12 |
| | | 280/610 |
| 2011/0002790 A1 | 1/2011 | Ebert et al. |
| 2018/0045207 A1* | 2/2018 | Paquin ................. B32B 27/281 |

FOREIGN PATENT DOCUMENTS

| CN | 101387205 A | 3/2009 |
| CN | 101988394 A | 3/2011 |

(Continued)

OTHER PUBLICATIONS

International Search Report issued in International Patent Application No. PCT/FR2019/053209, dated May 7, 2020.
(Continued)

*Primary Examiner* — Camie S Thompson
(74) *Attorney, Agent, or Firm* — Pillsbury Winthrop Shaw Pittman LLP

(57) ABSTRACT

A part of a turbomachine made of composite material includes a fiber reinforcement having a three-dimensional weaving including a first set of yarns made of a first material, wherein the fiber reinforcement includes a vibration-damping element formed by a second set of yarns including a second material which is viscoelastic and which is different to the first material, the second set of yarns being woven with the first set of yarns.

15 Claims, 3 Drawing Sheets

(51) Int. Cl.
    *B29L 31/08*     (2006.01)
    *D03D 25/00*     (2006.01)

(52) U.S. Cl.
    CPC ..... *B29L 2031/082* (2013.01); *D10B 2505/02* (2013.01); *F05D 2220/32* (2013.01); *F05D 2300/6034* (2013.01)

(58) Field of Classification Search
    CPC ................ B29B 11/16; B29L 2031/08; B29L 2031/082; D03D 25/005; D10B 2505/02; D01D 5/282; F01D 25/005; F01D 2220/32; F01D 2220/36; F01D 5/282; F05D 2300/224; F05D 2300/6033; F05D 2300/6034; F05D 2220/32; F05D 2220/36; F05D 2300/24; Y02T 50/60; D06M 15/59; D06M 15/55; D06M 2101/40

USPC .................. 428/102, 377, 231, 269; 442/205
    See application file for complete search history.

(56) References Cited

FOREIGN PATENT DOCUMENTS

| | | |
|---|---|---|
| CN | 103518039 A | 1/2014 |
| CN | 107269750 A | 10/2017 |
| EP | 0 235 087 A1 | 9/1987 |
| EP | EP 2 037 082 A1 | 3/2009 |
| FR | FR 2 964 426 A1 | 3/2012 |
| WO | WO 2016/030613 A1 | 3/2016 |

OTHER PUBLICATIONS

First Office Action as issued in Chinese Patent Application No. 201980085084.4, dated Jan. 26, 2022.

\* cited by examiner

FIBER-REINFORCED COMPOSITE PART WITH INCREASED VIBRATION RESISTANCE

CROSS-REFERENCE TO RELATED APPLICATIONS

This application is the U.S. National Stage of PCT/FR2019/053209, filed Dec. 19, 2019, which in turn claims priority to French patent application number 1873851 filed Dec. 21, 2018. The content of these applications are incorporated herein by reference in their entireties.

TECHNICAL FIELD

This invention relates to the general field of turbomachines, and more particularly turbomachines for aircraft.

PRIOR ART

It is known to use turbomachine parts which are made of composite material with a fiber reinforcement made by three-dimensional weaving, particularly for fan blades.

However, during the operation of the turbomachine, the parts of said turbomachine may be subject to vibrations. These vibrations can excite the parts in a natural mode of said parts. However, a part excited at one of its own modes risks becoming damaged and damaging neighboring components.

Thus, in order to avoid a part being excited at one of its own modes, it is known to adapt the shape of said part. For example, fan blades have a shape that is adapted to minimize the excitation of said fan blades at their natural modes.

However, an optimized shape of the part, i.e. a shape making it possible to improve the performance of the part, can be a shape for which a natural mode of the part is excited during the operation of said part. Thus the current situation does not make it possible to give the part its optimized shape. For example, the aerodynamic performance of the fan blades is degraded in order to give said fan blades a shape limiting the excitation of the natural modes of said blades.

SUMMARY OF THE INVENTION

This invention thus has the main aim of palliating such drawbacks by proposing a turbomachine part possessing an internal mechanism for damping the vibrations undergone by said part. Thus, it is possible to give the part a more optimized shape, particularly for aerodynamic parts, without increasing the risk of said part entering resonance.

According to a first aspect, the invention proposes a part for a turbomachine made of composite material comprising a fiber reinforcement having a three-dimensional weaving comprising a first set of yarns made of a first material, characterized in that the fiber reinforcement comprises a vibration-damping element formed by a second set of yarns comprising a second material which is viscoelastic and which is different to the first material, the second set of yarns being woven with the first set of yarns.

The turbomachine part can also comprise the following features, which can be taken alone or else in combination according to the technical possibilities:
- the second material is made of a viscoelastic material having a shear loss factor greater than or equal to 0.2 over a temperature range between −50° C. and 120° C., the shear loss factor being determined by imposing a sinusoidal shear stress of a frequency equal to 100 Hz;
- the first set of yarns is woven in a first weaving pattern which is three-dimensional, the second set of yarns being woven in a second weaving pattern which is different to the first weaving pattern;
- the first set of yarns has a first warp shrinkage angle and the second set of yarns has a second warp shrinkage angle, the first warp shrinkage angle being different to the second warp shrinkage angle;
- the second warp shrinkage angle is greater than the first warp shrinkage angle;
- the fiber reinforcement comprises at least a first portion composed of the first set of yarns, and at least a second portion on which warp yarns and/or weft yarns of the fiber reinforcement are formed by yarns of the second set of yarns;
- the second material is an elastomer;
- the second set of yarns comprises yarns composed of the second material;
- the second set of yarns comprises yarns having a coating made of the second material;
- the second set of yarns comprises yarns formed by fibers made of the second material and fibers made of another material;
- the part is a blade;
- the blade is a fan blade;
- the weaving pattern of the fiber reinforcement is chosen from among one of the following weaves: interlock, multi-canvas, multi-satin and multi-twill;
- the first material of the first set of yarns is chosen from among the following materials: carbon yarns, glass yarns, aramid yarns;
- the part comprises a third set of yarns made of a third material, said third set of yarns forming layers surrounding the first set of yarns and the second set of yarns.

According to a second aspect, the invention proposes a turbomachine comprising a part as claimed in any of the previous features.

BRIEF DESCRIPTION OF THE DRAWINGS

Other features and advantages of this invention will become apparent from the description given below, with reference to the appended drawings which illustrate an exemplary embodiment thereof devoid of any limitation.

DESCRIPTION OF THE EMBODIMENTS

Figure 1:
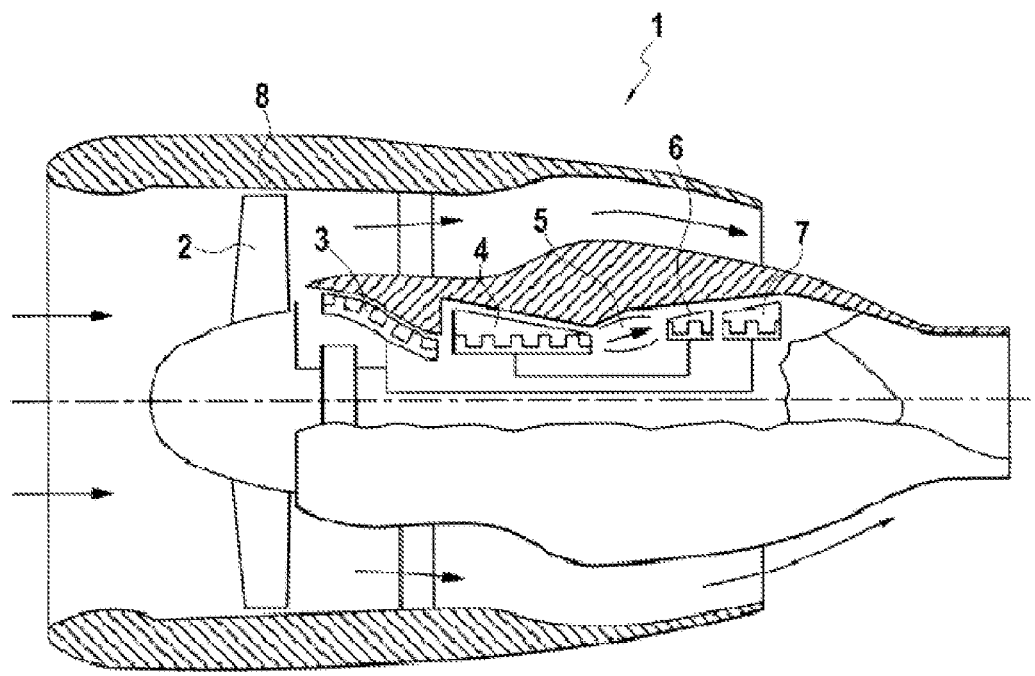
FIG. 1 shows a schematic view of a turbomachine.

As illustrated in FIG. 1, along the direction of circulation of the air flow, a turbomachine 1 comprises a fan 2, a low-pressure compressor 3, a high-pressure compressor 4, a combustion chamber 5, a high-pressure turbine 6, and a low-pressure turbine 7.

In addition, the turbomachine 1 comprises different casings, such as for example a fan casing 8 which surrounds the fan 2, which surround different elements of said turbomachine 1.

Furthermore, the turbomachine 1 can be a turbomachine with a reduction gear, thus making it possible to uncouple the fan 2 and the low-pressure turbine 7, or else the fan 2 can be directly coupled to the low-pressure shaft which is rotationally driven by the low-pressure turbine 7.

The invention can be applicable for various parts of the turbomachine 1 which are subject to vibrations and which are thus liable to enter resonance, and particularly for blades of said turbomachine. Specifically, the blades of the turbomachine are elements which are particularly subject to vibrations.

In particular, the invention applies for blades of the fan 2, which are particularly subject to vibrations, for example when the fan 2 is subjected to a crosswind.

Figure 2:
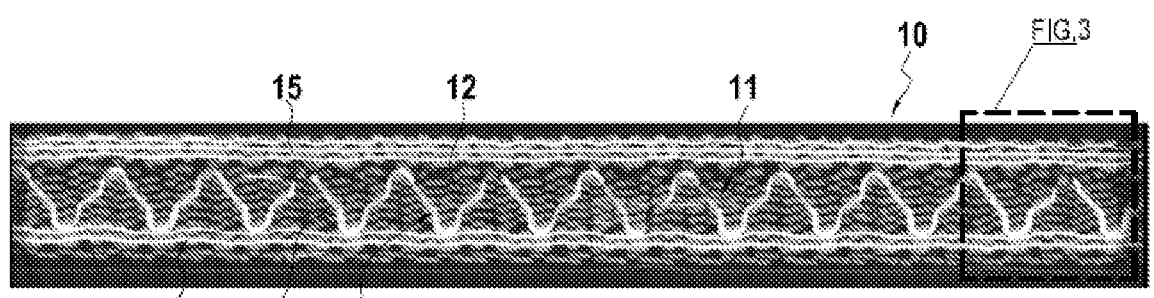
FIG. 2 shows a view of a section of a part according to a variant of the invention taken by X-ray.

As can be seen in FIG. 2, a part 10 according to the invention is a part made of composite material comprising a fiber reinforcement 11 densified by a matrix. The matrix can for example be a polymer matrix, particularly an epoxy matrix, or else a carbon matrix. The fiber reinforcement 11 has weaving which is three-dimensional.

FIG. 2 is an X-ray view (μCT view) of a section of a part 10 of the turbomachine 1. The color difference between the yarns indicates a difference in density between the component materials of the different yarns.

The fiber reinforcement 11 comprises a first set of yarns 12. The first set of yarns 12 is woven according to a first weaving pattern which is three-dimensional. The first set of yarns 12 has the function of imparting to the fiber reinforcement its mechanical resistance characteristics.

The term "three-dimensional weaving" or "3D weaving" should here be understood to mean a method of weaving by which at least some of the warp yarns link weft yarns over several layers of weft.

The production of the fibrous structure by 3D weaving makes it possible to obtain a link between the layers, and therefore to have a good mechanical resistance of the fiber structure and the composite material part obtained, in a single textile operation.

The three-dimensional weaving pattern of the fiber reinforcement 11 can be chosen from among one of the following weaves: interlock, multi-canvas, multi-satin and multi-twill. Thus, the first weaving pattern can be chosen from among one of the following weaves: interlock, multi-canvas, multi-satin and multi-twill.

Figure 4:
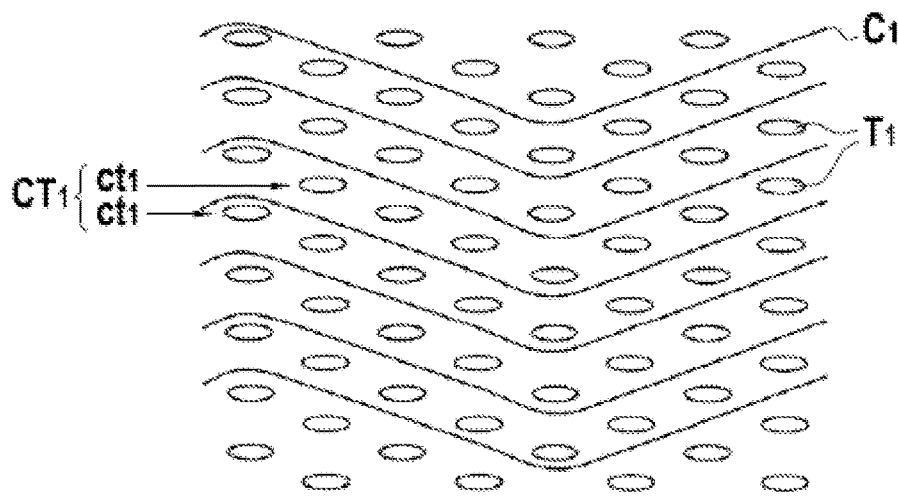
FIG. 4 illustrates a plane of an interlock three-dimensional weave.

The term "interlock weave or fabric" should here be understood to mean a three-dimensional weave wherein each of the warp yarns links several layers of weft yarns with all the yarns of the same warp column having the same movement in the weave plane. FIG. 4 is a view of 8 planes of an interlock weave with 7 layers of warp yarns C1 and 8 layers CT1 of weft yarns T1. In the interlock weave illustrated, one layer CT1 of weft yarns T1 is formed from two adjacent half-layers ct1 offset with respect to one another in the warp direction. This therefore gives 16 half-layers of weft yarns positioned in a staggered pattern. Each warp yarn C1 links 3 half-layers of weft yarns. One could also choose an unstaggered weft arrangement, the weft yarns of two neighboring layers of weft yarn being aligned on the same columns.

Figure 5:
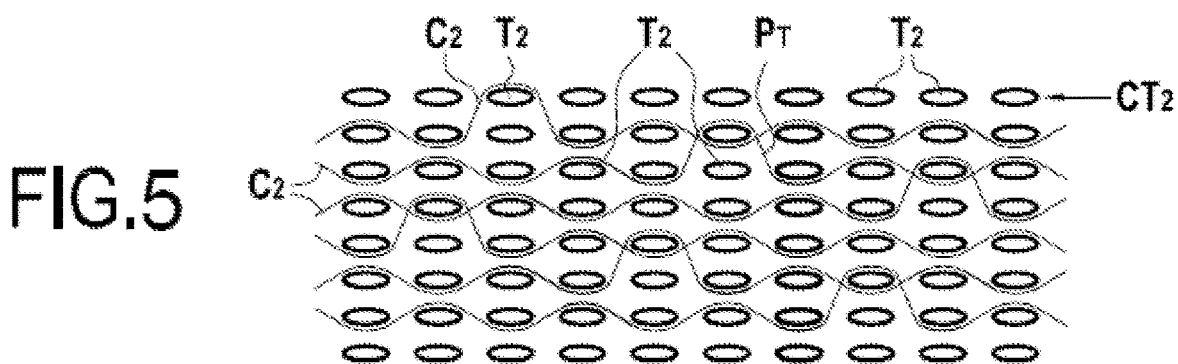
FIG. 5 illustrates a plane of a multi-canvas three-dimensional weave.

The term "multi-canvas weave or fabric" here denotes a 3D weaving with several layers of weft yarns, in which the base weave of each layer is equivalent to a weave of conventional canvas type but with certain stitches of the weave linking the layers of weft yarn to one another. FIG. 5 shows a plane of a multi-canvas fabric wherein warp yarns C2 are from time to time deviated from their conventional 2D canvas trajectory associated with a layer CT2 of weft yarns to grip a weft yarn T2 of a neighboring layer and form particular canvas stitches PT linking two layers of neighboring weft yarns. At the level of a particular canvas stitch PT, the warp yarn C2 passes around two weft yarns T2 located on one and the same column in two neighboring weft layers CT2.

Figure 6:
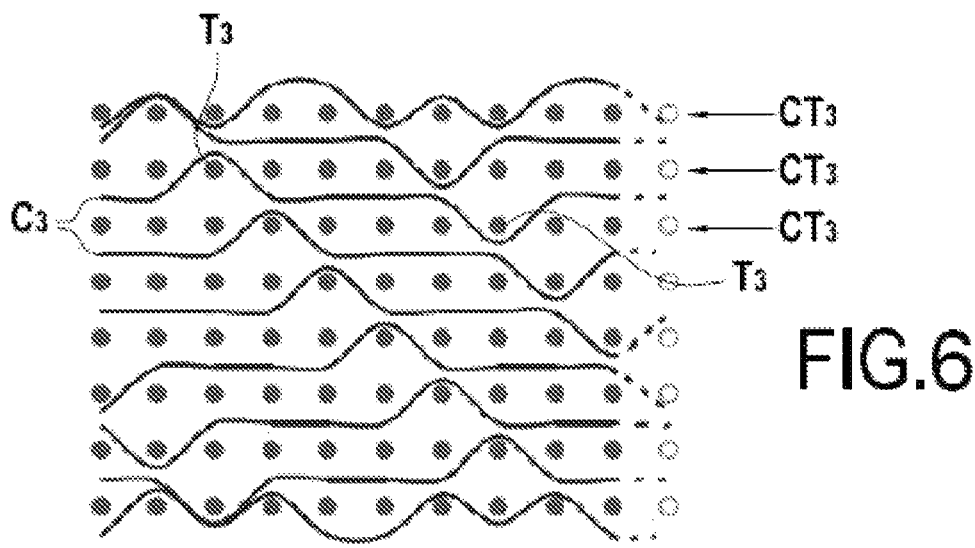
FIG. 6 illustrates a plane of a multi-satin three-dimensional weave.

The term "multi-satin weave or fabric" here denotes a 3D weaving with several layers of weft yarns in which the base weave of each layer is equivalent to a weave of conventional satin type but with certain stitches of the weave linking the layers of weft yarn to one another. FIG. 6 shows a plane of a multi-satin fabric, wherein each warp yarn C3, except for the warp yarns located at the texture surface, is deviated alternatively in one direction and the other in such a way as to grip one weft yarn T3 out of n of a first layer CT3 of weft yarns and one weft yarn T3 out of n of a second layer CT3 of weft yarns adjacent to the first, n being an integer number greater than 2 thus producing a link between two layers.

Figure 7:
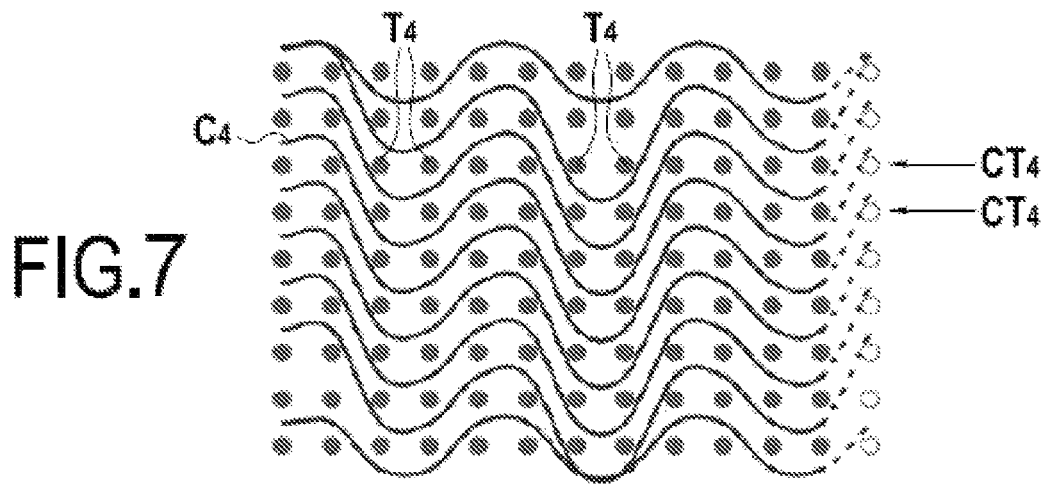
FIG. 7 illustrates a plane of a multi-twill three-dimensional weave.

The term "multi-twill weave or fabric" here denotes a 3D weaving with several layers of weft yarns in which the base weave of each layer is equivalent to a weave of conventional twill type but with certain stitches of the weave linking the layers of weft yarn to one another. FIG. 7 shows a plane of a multi-twill fabric, wherein each warp yarn C4, except for the warp yarns located at the texture surface, is deviated in such a way as to grip in twos some of the weft yarns T4 of a layer CT4 of weft yarns or of several neighboring layers CT4 of weft yarns.

To damp the vibrations, the fiber reinforcement 11 of the part 10 also comprises a vibration-damping element 13 which is formed by a second set of yarns 14 which is woven from the first set of yarns 12. The second set of yarns 14 comprises a second material which is different to the first material, said second material being a viscoelastic material. The fact that the second set of yarns 14 is woven with the first set of yarns 12 makes it possible to avoid the damping element 13 becoming detached from the rest of the part 10.

The fact that the second set of yarns 14 comprises a viscoelastic material makes it possible to damp the vibrations of the part 10, owing to the damping of a part of the energy by the deformation of the viscoelastic material, particularly when the viscoelastic material is shear stressed.

The location of the vibration-damping element 13 in the part 10 makes it possible to select the natural modes for which said vibration-damping element 13 damps the deformations. The vibration-damping element 13 can for example be located on an area of the part 10 which is the most deformed in a natural mode of said part 10.

It is thus possible to choose shapes for the part 10 for which said part 10 possesses natural modes which are liable to be excited during the operation of the turbomachine 1 but for which said part 10 has a better performance (particularly aerodynamic performance), the vibration-damping element 13 being adapted to damp these natural modes.

The second material can have a shear loss factor greater than or equal 0.2 over the temperature range between −50° C. and 120° C., the shear loss factor being determined by imposing a sinusoidal shear stress of frequency equal to 100 Hz. The shear loss factor of a material is, in a manner known per se, the ratio of the imaginary part of its complex shear module to the real part of its complex shear module. The shear loss factor corresponds to the tangent of the phase shift of the deformation undergone by the second material with respect to the shear stress, this factor quantifying the quantity of energy absorbed by said material upon its deformation under this stress. Such a feature advantageously makes it possible to further dissipate the vibrational energy.

The shear loss factor of the second material can in particular be greater than or equal to 0.4.

The second material can be an elastomer. The second material can for example by natural rubber (NR), synthetic rubber (IR), polybutadiene (BR), styrene-butadiene (SBR), acrylonitrile butadiene (NBR), ethylene-propylene-diene (EPDM), polyurethane (PU/EU), polychloroprene (CR), isobutylene-isoprene (IIR), silicone (polysiloxane) (SI), fluoroelastomer (FKM/FPM), perfluoroelastomer (FFKM), fluorosilicone, chlorosulphonated polyethylene (CSM), epichlorhydrine (CO/ECO), nitrile rubber (NBR), epoxy-terminated nitrile rubber (ETBN), carboxylated polybutadiene (CTBN), or else amino-terminated nitrile rubber (ATBN). The second material may be a thermoplastic, or else the second material may be a thermosettable material. The second material may also be for example made of acrylonitrile butadiene styrene (ABS), polyamide (PA), polyetheretherketone (PEEK), or polyetherimide (PEI).

The first material can for example be chosen from among the following materials: carbon yarns, glass yarns, or aramid yarns (particularly Kevlar).

The vibration-damping element 13 can be incorporated into the part 10 according to several possible variants.

According to a first variant, the vibration-damping element 13 is incorporated into the part 10 by producing the fiber reinforcement 11 such that it comprises the first set of yarns 12 woven in a first weaving pattern which is three-dimensional, and the second set of yarns 14 which is woven in a second weaving pattern which is different to the first weaving pattern.

The fact that the second set of yarns 14 on the one hand has a second weaving pattern different to the first weaving pattern of the first set of yarns 12, and that on the other hand said second set of yarns 14 comprises the second material which is a viscoelastic material, makes it possible to reinforce the fact that the second set of yarns 14 undergoes a shear stress when the part deforms at a natural mode to damp the vibrations of said part 10.

This first variant has the advantage that the incorporation of the vibration-damping element 13 does not modify the first set of yarns 12, thus simplifying the manufacturing of the part 10. Specifically, the second set of yarns 14 is disposed in the pores formed by the first set of yarns 12 which forms the warp and weft yarns, the second set of yarns 14 is disposed in the pores formed by the first set of yarns 12 which forms the warp and weft yarns of the weave of the fiber reinforcement 11, thus only taking the place of a portion of the matrix of the part 10.

Figure 3:
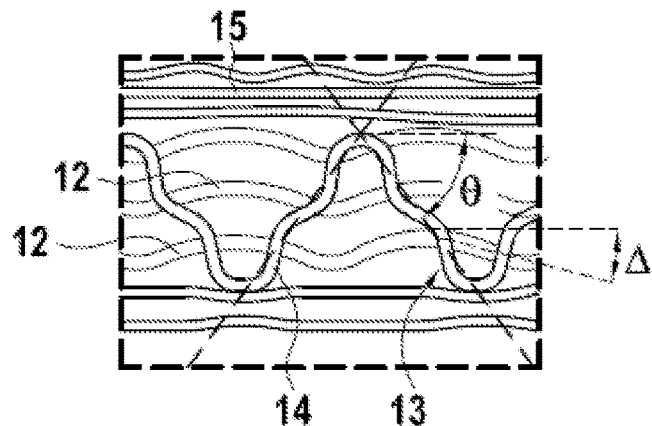
FIG. 3 shows a detail view of FIG. 2 of the warp shrinkage angles of the first set of yarns and of the second set of yarns.

As can be seen in FIG. 3, the first set of yarns 12 has a first warp shrinkage angle Δ, and the second set of yarns 14 has a second warp shrinkage angle θ.

To increase the deformation difference between the first set of yarns 12 and the second set of yarns 14, and thus increase the shear stress on said second set of yarns 14, the first warp shrinkage angle Δ and the second warp shrinkage angle θ are different.

The warp shrinkage angle is equivalent to the difference between the length of a yarn when said yarn is woven and the length when said yarn is taut. Thus, the higher the warp shrinkage angle, the more the yarn follows a winding trajectory when said yarn is woven, and the lower the warp shrinkage angle, the more the yarn follows a taut trajectory when said yarn is woven.

The difference in warp shrinkage between the first set of yarns 12 and the second set of yarns 14 can be realized by a difference in the number of layers of warp yarns or weft yarns traversed.

Preferably, the second warp shrinkage angle θ is greater than the first warp shrinkage angle Δ, thus making it possible to further increase the shear stresses applied to the second set of yarns 14 when the part 10 is deformed in a natural mode.

According to a second possible variant, the vibration-damping element 13 is incorporated into the part 10, not by adding the yarns of the second set of yarns 14 between the warp and weft yarns of the weave of the fiber reinforcement 11 formed by the first set of yarns 12 as is the case in the first variant, but by locally replacing warp and/or weft yarns of the weave of the fiber reinforcement 11 with yarns of the second set of yarns 14, or else by locally adding warp and/or weft yarns of the weave of the fiber reinforcement 11 with yarns of the second set of yarns 14.

Thus, according to the second variant, the fiber reinforcement 11 comprises at least a first portion composed of the yarns of the first set of yarns 12, and at least a second portion on which warp and/or weft yarns of the fiber reinforcement 11 are formed by yarns of the second set of yarns 14. The number and position of the first portions and the second portions of the fiber reinforcement 11 are adapted according to the natural modes one wishes to dampen.

On the first portion, the fiber reinforcement 11 is devoid of the second set of yarns 14, the warp and weft yarns are formed solely by yarns of the first set of yarns 12 which are in the first material. On the second portion, at least a part (and nearly all) of the warp and/or weft yarns of the weave of the fiber reinforcement 11 are formed by yarns of the second set of yarns 14, i.e. yarns comprising the second material.

Thus, in the second variant, the first set of yarns 12 and the second set of yarns 14 are woven in the same pattern of three-dimensional weaving, this pattern being the weave of the fiber reinforcement 11.

According to a possible embodiment, the yarns of the second set of yarns 14 are composed of the second material. Thus, according to a possible embodiment, the second set of yarns 14 can be composed of elastomer yarns.

According to another possible embodiment, the yarns of the second set of yarns 14 can comprise a coating made of the second material. In this variant, the yarns of the second set of yarns 14 comprise a core made of a third material which is surrounded by the coating made of the second material, said third material being different to the second material. The third material may be identical to the first material. The third material can for example be made of carbon. Thus, according to a possible embodiment, the second set of yarns 14 may comprise yarns comprising a carbon core surrounded by a coating made of elastomer.

According to another possible embodiment, the yarns of the second set of yarns may comprise fibers made of the second material. The yarns of the second set of yarns 14 may thus be hybrid yarns formed by weaving fibers made of the second material and fibers made of the fourth material, said fourth material being different to the second material. The fourth material may be identical to the first material. The fourth material may for example be made of carbon. Thus, according to a possible embodiment, the second set of yarns 14 may comprise yarns formed by weaving of carbon fibers and elastomer fibers.

The part 10 can typically be a blade of a rotor of the turbomachine 1, and in particular a blade of the fan 2 of the turbomachine 1. The part 10 can also be a casing of the turbomachine 1, for example a casing of the fan 2.

In addition, as illustrated in FIG. 2, the part 10 can also comprise a third set of yarns 15 composed of a third material, which can be different to the first material and the second material, or else identical to the first material. The third set of yarns 15 forms a layer on the outer walls of the part 10, said third set of yarns 15 thus surrounding the first set of yarns 12 and the second set of yarns 14.

In the case of a blade, the third set of yarns 15 may for example form a layer on the suction face and a layer on the pressure face of said blade. In the case of a casing, the third set of yarns 15 may for example form a layer on an outer face and a layer on an internal face of said casing with respect to the shaft of the turbomachine 1.

The third set of yarns 15 may be woven in a two-dimensional weaving, or else be formed by stacking unidirectional plies.

The term "two-dimensional weaving" or "2D weaving" should here be understood to mean a conventional weaving method by which each warp yarn passes from one side to the other of the yarns of a single weft layer.

The term "one-directional plies" or "UD plies" should here be understood to mean plies of unwoven yarns formed by a set of yarns all extending in one and the same direction.

The third material of the third set of yarns 15 can for example be made of carbon fiber, glass fiber, or else for example aramid fiber (and in particular Kevlar).

The invention claimed is:

1. A part for a turbomachine made of composite material comprising a fiber reinforcement having a three-dimensional weaving comprising a first set of yarns made of a first material, wherein the fiber reinforcement comprises a vibration-damping element formed by a second set of yarns comprising a second material which is viscoelastic and which is different to the first material, the second set of yarns being woven with the first set of yarns,
    wherein the second material is made of a viscoelastic material having a shear loss factor greater than or equal to 0.2 over a temperature range between −50° C. and 120° C., the shear loss factor being determined by imposing a sinusoidal shear stress of a frequency equal to 100 Hz.

2. The part as claimed in claim 1, wherein the first set of yarns is woven in a first weaving pattern which is three-dimensional, the second set of yarns being woven in a second weaving pattern which is different to the first weaving pattern.

3. The part as claimed in claim 2, wherein the first set of yarns has a first warp shrinkage angle and the second set of yarns has a second warp shrinkage angle, the first warp shrinkage angle being different to the second warp shrinkage angle.

4. The part as claimed in claim 3, wherein the second warp shrinkage angle is greater than the first warp shrinkage angle.

5. The part as claimed in claim 1, wherein the fiber reinforcement comprises at least a first portion composed of the first set of yarns, and at least a second portion on which warp yarns and/or weft yarns of the fiber reinforcement are formed by yarns of the second set of yarns.

6. The part as claimed in claim 1, wherein the second material is an elastomer.

7. The part as claimed in claim 1, wherein the second set of yarns comprises yarns consisting of the second material.

8. The part as claimed in claim 1, wherein the second set of yarns comprises yarns having a coating made of the second material.

9. The part as claimed in claim 1, wherein the second set of yarns comprises yarns formed by fibers made of the second material and fibers made of another material.

10. The part as claimed in claim 1, wherein the part is a blade.

11. The part as claimed in claim 10, wherein the blade is a fan blade.

12. The part as claimed in claim 1, wherein the weaving pattern of the fiber reinforcement is chosen from among one of the following weaves: interlock, multi-canvas, multi-satin and multi-twill.

13. The part as claimed in claim 1, wherein the first material of the first set of yarns is chosen from among the following materials: carbon yarns, glass yarns, aramid yarns.

14. The part as claimed in claim 1, wherein said part comprises a third set of yarns made of a third material, said third set of yarns forming layers surrounding the first set of yarns and the second set of yarns.

15. A turbomachine comprising a part as claimed in claim 1.

* * * * *